United States Patent
Gundavelli et al.

(10) Patent No.: US 11,895,085 B2
(45) Date of Patent: *Feb. 6, 2024

(54) IDENTIFIER LOCATOR ADDRESSING FOR IPV6-BASED SOFTWARE DEFINED FABRIC

(71) Applicant: Cisco Technology, Inc., San Jose, CA (US)

(72) Inventors: Srinath Gundavelli, San Jose, CA (US); Shree N. Murthy, San Jose, CA (US); Sudhir Kumar Jain, Fremont, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 214 days.

This patent is subject to a terminal disclaimer.

(21) Appl. No.: 17/473,218

(22) Filed: Sep. 13, 2021

(65) Prior Publication Data

US 2021/0409370 A1 Dec. 30, 2021

Related U.S. Application Data

(63) Continuation of application No. 16/364,630, filed on Mar. 26, 2019, now Pat. No. 11,159,480.

(51) Int. Cl.
  *H04L 61/5014* (2022.01)
  *H04W 72/04* (2023.01)
  *H04L 101/622* (2022.01)

(52) U.S. Cl.
  CPC ......... *H04L 61/5014* (2022.05); *H04W 72/04* (2013.01); *H04L 2101/622* (2022.05)

(58) Field of Classification Search
  CPC ... H04L 61/103; H04L 45/02; H04L 61/6059; H04L 61/5014; H04L 61/2007; H04L 61/2015; H04L 45/741
  See application file for complete search history.

(56) References Cited

U.S. PATENT DOCUMENTS

| 9,007,918 B2 | 4/2015 | Punati et al. |
| 9,258,218 B2 | 2/2016 | Hampel et al. |

(Continued)

FOREIGN PATENT DOCUMENTS

JP   2017147492 A   8/2017

OTHER PUBLICATIONS

Musab Muhammad Isah, "An Improved Locator Identifier Split Architecture (ILISA) to Enhance Mobility", School of Computing and Communications, Lancaster University, Thesis Submitted for Degree of Doctor of Philosophy, Oct. 2017, 224 pages.

(Continued)

*Primary Examiner* — Khaled M Kassim
*Assistant Examiner* — Najeeb Ansari
(74) *Attorney, Agent, or Firm* — Edell, Shapiro & Finnan, LLC

(57) ABSTRACT

A network management center includes a Dynamic Host Configuration Protocol (DHCP) server. The network management center obtains from an identity server, client information indicating authentication of a client device in a wireless network that is connected to a network fabric. The network management center obtains from an edge node in the network fabric an Internet Protocol (IP) address request for the client device. The IP address request including a fabric domain identifier associated with the edge node. The network management center allocates an IP address for the client device based on the client information obtained from the identity server and the fabric domain identifier contained in the IP address request obtained from the edge node. The network management center provides to the edge node an Identifier Locator Addressing (ILA) address based on the IP address.

20 Claims, 6 Drawing Sheets

(56) References Cited

U.S. PATENT DOCUMENTS

| | | | |
|---|---|---|---|
| 9,900,238 B2 | 2/2018 | Kang et al. | |
| 2005/0027834 A1 | 2/2005 | Chen et al. | |
| 2011/0202670 A1 | 8/2011 | Zheng | |
| 2014/0307651 A1 | 10/2014 | Sarikaya et al. | |
| 2014/0313933 A1* | 10/2014 | Chen | H04L 69/08 |
| | | | 370/254 |
| 2018/0219783 A1 | 8/2018 | Pfister et al. | |
| 2018/0270741 A1* | 9/2018 | Enomoto | H04W 76/12 |
| 2019/0124040 A1* | 4/2019 | Avula | H04W 76/12 |
| 2019/0238502 A1 | 8/2019 | Bottorff | |
| 2020/0028758 A1 | 1/2020 | Tollet et al. | |
| 2020/0314060 A1 | 10/2020 | Gundavelli et al. | |

OTHER PUBLICATIONS

Michael Hoefling et al., "A Survey of Mapping Systems for Locator/Identifier Split Internet Routing", IEEE Communications Surveys & Tutorials, vol. 15, No. 4, Fourth Quarter 2013, 17 pages.

Joonsuk Kang et al., "An Identifier / Locator Split Architecture for Multi-homing and Mobility Support", IJCSNS International Journal of Computer Science and Network Security, vol. 13 No.5, May 2013, 7 pages.

Spencer Sevilla et al., "A Deployable Identifier-Locator Split Architecture", ISBN 978-3-901882-94-4, https://ieeexplore.ieee.org/document/8264833, Jun. 12-16, 2017, 9 pages.

Bohao Feng et al., "Locator/Identifier Split Networking: A Promising Future Internet Architecture", IEEE Communications Surveys & Tutorials, vol. 19, No. 4, Jul. 18, 2017, 22 pages.

\* cited by examiner

IDENTIFIER LOCATOR ADDRESSING FOR IPV6-BASED SOFTWARE DEFINED FABRIC

CROSS REFERENCE TO RELATED APPLICATION

This application is a continuation of U.S. patent application Ser. No. 16/364,630, filed Mar. 26, 2019, the entirety of which is incorporated herein by reference.

TECHNICAL FIELD

The present disclosure relates to network address techniques.

BACKGROUND

Identifier Locator Addressing (ILA) techniques involve representing an Internet Protocol version 6 (IPv6) address where the address is split into a locator and an identifier component. The locator component indicates the topological location of a node in the network and the identifier indicates the node's identity. The locators are routable entities within the network. An endpoint is addressed by the identifier. The identifier of an endpoint is unique and permanent for its lifetime, whereas the locator portion is subject to change over time. The locators are mapped to the identifiers to traverse through the network.

DESCRIPTION OF EXAMPLE EMBODIMENTS

Overview

Figure 1:
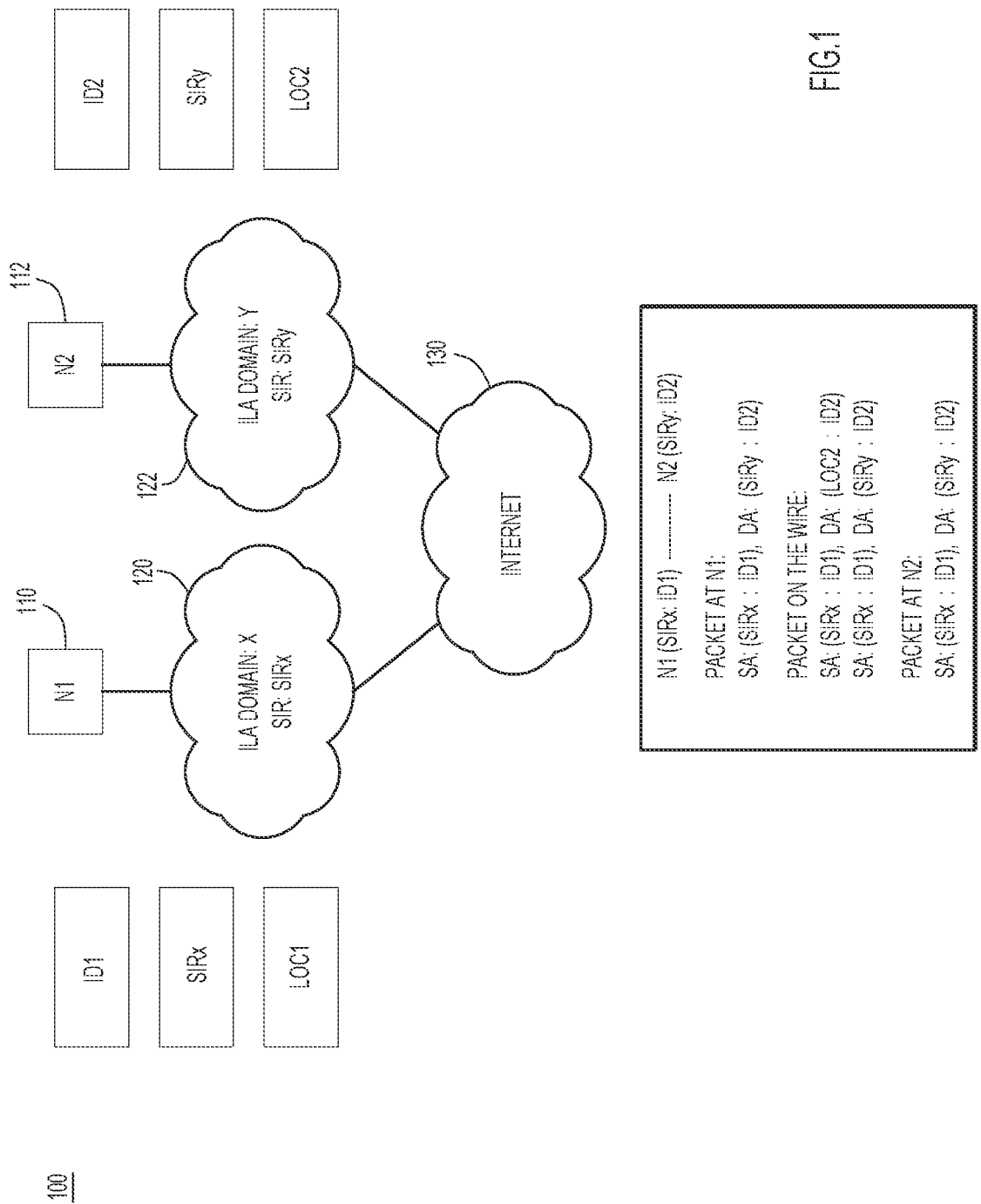
FIG. 1 is a diagram of a network environment showing the use of ILA techniques that are leveraged for use in a software defined fabric, according to an example embodiment.

In one form, a network management center includes a Dynamic Host Configuration Protocol (DHCP) server. The network management center obtains from an identity server, client information indicating authentication of a client device in a wireless network that is connected to a network fabric. The network management center obtains from an edge node in the network fabric an Internet Protocol (IP) address request for the client device. The IP address request including a fabric domain identifier associated with the edge node. The network management center allocates an IP address for the client device based on the client information obtained from the identity server and the fabric domain identifier contained in the IP address request obtained from the edge node. The network management center provides to the edge node an Identifier Locator Addressing (ILA) address based on the IP address.

In another form, an edge node in a network fabric obtains client information indicating authentication of a client device in a wireless network that is connected to the network fabric. The edge node obtains on behalf of the client device an Internet Protocol (IP) address request for the client device. The edge node provides to a network management center that includes a Dynamic Host Configuration Protocol (DHCP) server, an address request for the client device. The address request includes a fabric domain identifier associated with the edge node. The edge node obtains from the network management center an Identifier Locator Addressing (ILA) address for the client device, the ILA address generated from an IP address allocated for the client device. The edge node provides the ILA address to the client device.

Example Embodiments

In current IP architectures, the IP Address is used both to indicate the location for routing the packets and also as an identity of the network node. For example, 171.1.1.1 is being used by host H1 and it is currently attached to a router R1 on subnet 171.1.1.0/24. It identifies the node and also the location.

When Host H1 opens a Transmission Control Protocol (TCP) connection to an application peer, the application is bound to this address. The peer's TCP connection is also bound to this address. If the Host H1 moves to a different subnet, such as 50.1.1.0/24, configures a new address 50.1.1.1, and starts sending packets using the new IP address, this will break the TCP connection as the peer cannot deal with this ID/location change. This is the basic architectural limitation in the current IP architectures when supporting mobility.

ILA attempts to address this issue with a clever scheme. One property of ILA involves supporting mobility without the need for any overlay encapsulation. ILA uses the technique of translation and reverse-translation on two ends of the network, eliminating the need for tunnels.

There are two types of addresses: ILA and Standard Identifier Representation (SIR) addresses. SIR addresses are stable addresses. An SIR address is composed of an application visible SIR prefix and an identifier/address. A host always uses SIR addresses when communicating with other hosts. An SIR address can be derived from a 128-bit Internet Protocol version 6 (IPv6) address.

SIR prefixes cannot be used for routing purposes. They can only be used to identify a domain, but cannot be used by the routing fabric for steering the packet to a specific point in the network.

ILA addresses include a Locator and an Identifier. The Locator has a topologically significance. It names a subnet and is used only for routing and forwarding the packet. The Identifier remains fixed and has no topological relation. The Identifier names a logical/virtual/physical node. It is the node's identity.

The Locator identifies a specific point (router) in the network. The routers in the network have a mapping table that allows them to translate between SIR addresses and ILA addresses. A 128-bit IPv6 address can be split into a Locator and an Identifier of an ILA address.

Every domain has a unique SIR prefix, e.g., a 64-bit prefix. For example, Domain 1 has an SIR prefix of SIR1 and Domain 2 has an SIR prefix of SIR2. Every host has a unique identifier, e.g., a 64-bit identifier. For example, host H1 has ID1 and host H2 has ID2. The SIR prefix and the Identifier (ID) form the complete 128-bit stable SIR address. For example, the stable SIR address for host H1 may be SIR1: ID1 and for host H2 SIR2: ID 2.

Referring first to FIG. 1, a simplified example is shown of a network environment 100 employing ILA techniques are employed. The network environment 100 includes nodes N1 and N2 shown at 110 and 112. Node N1 is part of an ILA Domain X shown at 120 and has an SIR address of SIRx. Node N2 is part of an ILA Domain Y shown at 122 and has an SIR address SIRy. The ILA domains 120 and 122 are connected to the Internet 130 as shown in FIG. 1. Thus, associated with Node 1 are an identifier ID1, an SIR address SIRx and a locator LOC1. Associated with Node 2 are an identifier ID2, an SIR address SIRy and a locator LOC2.

An ILA router in the ILA domain 120 and 122 performs address translation without encapsulations. The translation is between SIR:ID and LOC:ID. There is a mapping system or mapping server that maintains a key-value store representing the association between Identifier, ILA address and SIR address. Since ILA is about packet forwarding in the network based on Locators, the Locators are not exposed to the endpoints. Endpoints know only about their SIR prefixes.

A unique identifier namespace is indicated by an SIR prefix. Each SIR prefix maps to an ILA domain, as shown in FIG. 1. Identifiers need not be statically bound to a host, to deal with privacy requirements. An Identifier to Locator mapping is propagated throughout the network to allow communication.

When a packet is sent to an SIR address, an ILA router or host overwrites the SIR prefix with a Locator corresponding to the Identifier. Packets received by ILA routers on the underlay network have their addresses reversed translated for reception at an end node.

For example, consider that Node N1 sends a packet to Node N2. The packet at N1 is identified by a source address (SA) that is defined by (SIRx: ID1) and a destination address (DA) defined by (SIRy: ID2). Note that the locator information is not relevant at this point because the packet has not yet been transported. What is used in the transport plane is the locator (LOC) addressing.

When the packet is sent form Node 1 into the network, the destination address of the packet is modified to replace SIRy with the locator LOC2 associated with ILA Domain Y where Node N2 is located. Then, when the packet reaches Node N2, the locator LOC2 is replaced with SIRy. Thus, when the packet reaches Node N2, the source address of the packet is (SIRx:ID1) and the destination address is (SIRy:ID2).

Figure 2:
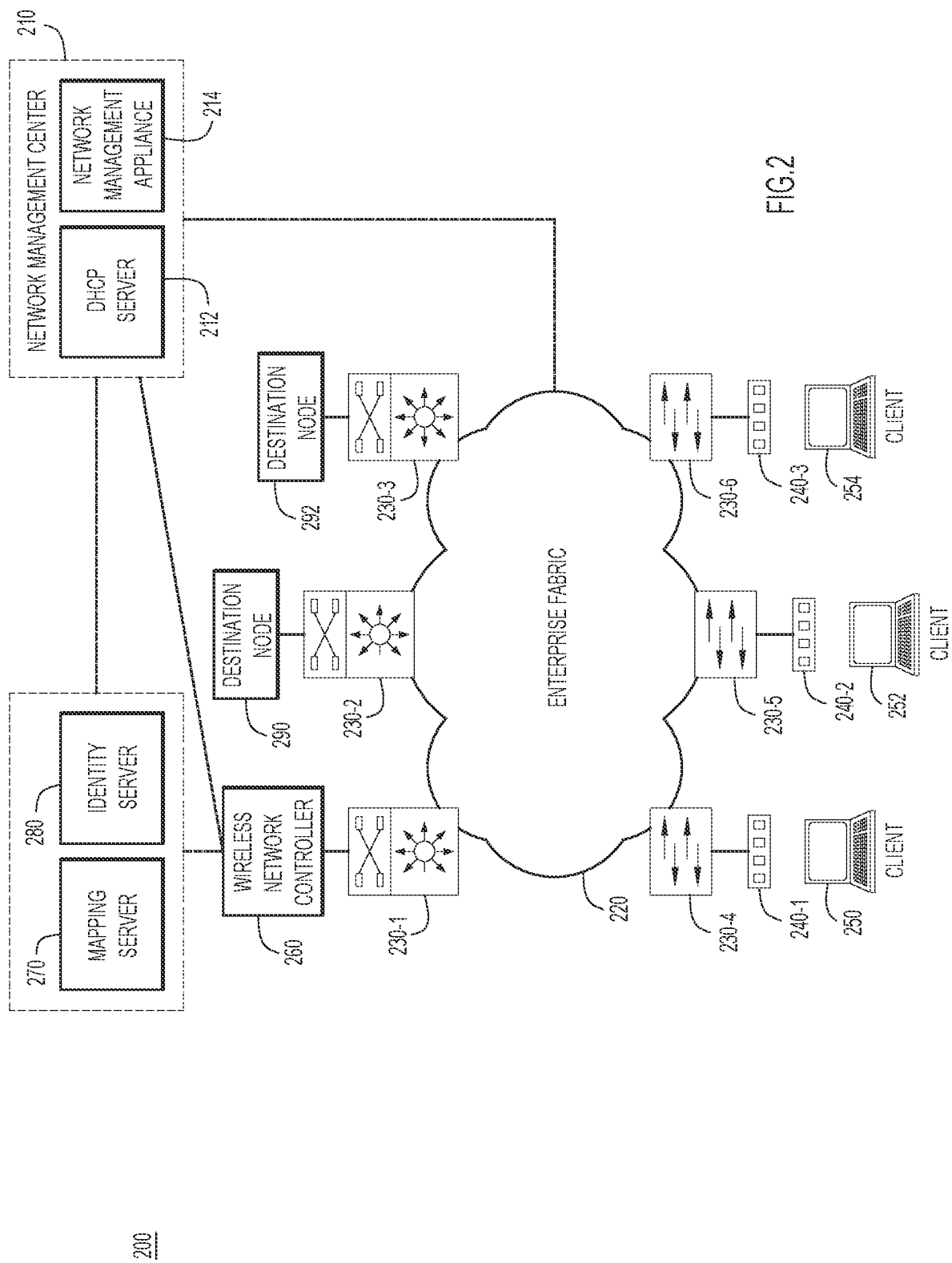
FIG. 2 is a system diagram showing the use of ILA techniques in a software defined fabric, according to an example embodiment.

Reference is now made to FIG. 2. Embodiments are presented herein in which ILA techniques are used for IPv6 clients. In particular, a mechanism is presented to leverage ILA addressing in the fabric data plane and leverage a Software-Defined Access (SDA) control plane to do packet forwarding within the fabric underlay without using a data path, such as Virtual Extensible Local Area Networking (VXLAN) encapsulation. This enables the fabric data path to eliminate tunnels (e.g., VXLAN tunnels) between the Fabric Edge (FE) nodes to which a client and destination are attached. Moreover, this solution enables the same flexibility and simplified mobility of the clients within the fabric, without the need for any packet encapsulation.

FIG. 2 shows system 200 that includes a network management center 210 that includes a Dynamic Host Configuration Protocol (DHCP) server 212 and a network management appliance 214. The network management center 210 is in communication with an enterprise fabric 220 that includes FE nodes 230-1, 230-2, 230-3, 230-4, 230-5, and 230-6. FE nodes 230-4, 230-5 and 230-6 are connected to a respective wireless local area network (WLAN) access point (AP) 240-1, 240-2 and 240-3. The APs 240-1, 240-2 and 240-3 enable connectivity with wireless clients 250, 252 and 254.

The system 200 further includes a wireless network controller 260 that is connected to FE node 230-1. The wireless network controller 260 is in communication with the network management center 210 and with a mapping server 270 and identity server 280. The network management center 210 is also in communication with the mapping server 270 and the identity server 280. In one form, the mapping server 270 and identity server 280 are part of the network management center 210.

There are two destination nodes 290 and 292 with which the wireless clients 250, 252 and 254 may communicate. The mapping server 270 pushes client information to the fabric edge to enable client data traffic, as described further below. The identity server 280 provides identity-based authentication of the wireless clients 250, 252 and 254.

There are some basic assumptions/configurations in the system 200. A non-overlapping ID space is one in which each ID is uniquely mapped to a SIR address. An overlapping ID space is one in which a (ID, VNID) tuple uniquely defines the SIR address associated with a given end-point, where a VNID is a virtual network identifier. All the lookups to the mapping server 270 in both cases are made using the (ID, VNID) tuple.

The APs 240-1, 240-2 and 240-3 join the wireless network controller 260 through the enterprise fabric 220. The wireless network controller 260 queries the mapping system 270 to get information about AP's locator information. The wireless network controller 260 pushes the AP's radio media access control (MAC) address to the mapping server 270 along with the AP location information (EID, LOC) mapping, where EID is an endpoint identifier. This mapping server 270 pushes the AP location information to the FE node to which AP is connected. The FE node will establish the access tunnel with the AP. For example, the mapping server 270 pushes the AP location information of AP 240-1 to FE node 230-4, the AP location information of AP 240-2 to FE node 230-5 and the AP location information of AP 240-3 to FE node 230-6.

Client Authentication

Client authentication happens using the client MAC address and the interaction of the wireless network controller 260 with the identity server 380. Upon authentication, the wireless network controller 260 registers the client MAC address and the LOC/FE behind which the client is located (derived based on the AP to which the client is associated) with the mapping server 270.

The mapping server 270 pushes the client information (MAC address, SGT information) to the appropriate FE node, where the SGT is a Security Group Tag. The FE node creates a MAC-address table entry for this client. This will enable the client to get an IP address.

When a client connects to the network and tries to access an application, the FE-bide automatically profiles the user and determines the user's ID, device being used, location, and time of access. The FE-node then tags all traffic coming from the client device based on the IT policy for the user's profile. The SGT is a numerical value and is either manually assigned to the access switches or automatically administered through the identity server 280. If the identity server 280 is used, it transmits the tag information to all the supported devices in the network. Every packet from the client device is tagged. Decisions based on the tag can be taken by any switch in the network. Typically, the switch connected to the server where the application or database resides enforces access based on IT policy. The client device's request will either be allowed or denied.

Client Obtaining ILA Address Assignment

Address assignment to a client may be DHCPv6-based. Alternatively, the IP address may be based on Stateless Address AutoConfiguration (SLAAC). SLAAC provides plug-and-play connectivity where the clients self-assigns an address based on the IPv6 prefix. Based on the client authentication credentials and the client's domain, an IPv6 address will be assigned to the client.

Every switch in the enterprise fabric 220 advertises a unique locator which is routable in the SDA fabric domain. A Segment ID and a SGT is carried in the packet: 128 bits contains the locator, identifier, VNID (24 bits) and SGT (16 bits), for example. The VNID and SGT can be used directly or can be a mapped identifier.

When the client does a DHCP request, the switch (FE-node) includes the fabric domain identifier (or SIR prefix) information in the DHCP request so that the DHCP server can allocate an identifier for that client. The client identifier contains the fabric domain information (SIR prefix) as well. DHCP bindings also will reflect the client ID and the SIR prefix.

Learning of the ILA Address by the Mapping Server

Once the client is assigned an ILA address, the switch learns about the client binding (client MAC address, client ILA) tuple and updates the mapping server 270 with client identifier and locator information mapping. The client identifier contains the ID and the SIR address of the client. The client locator is the unique locator of the switch.

The mapping server 270 always maintains the (SIR:ID) Locator mapping. SIR prefix represents the fabric domain and hence, every router will have its own configured SIR prefix. The mapping server 270 can push this information to all the FE nodes (publish-subscribe model) or the FE nodes can pull that information on demand.

Forwarding Based on ILA Addressing (Data Path)

The client sends a packet to the destination (SIR:ID), as described above in connection with FIG. 2. The source access switch (FE node) queries the mapping server 270 to fetch the location information of the destination node (SIR-Dest:ID-Dest).

The source access switch (FE node) replaces (both source SIR and the destination SIR will be replaced with the locator):

(SIR-Source: ID-Source) with (Loc-Source: ID-Source)
(SIR-Dest: ID-Dest) with (Loc-Dest: ID-Dest)
Loc-Dest is a routable prefix in the enterprise fabric 220.

At the destination switch, the locators are translated to corresponding SIR addresses before forwarding the packets to the destination node. Two lookups are made the mapping server to obtain the SIR address corresponding to the source locator and the destination locator.

In one variation, each FE node can maintain a cache of all the supported SIR addresses. As a result, a query to the mapping server 270 will be made to get the corresponding location information only if the incoming SIR address matches the address present in its local cache. The mapping system is queried using the (ID, VNID) tuple.

Transport Security

Security is may be achieved using MAC Security (MACSec) as a hop-by-hop encryption mechanism, and with Datagram TLS (dTLS).

Operational Flow Example

Figure 3:
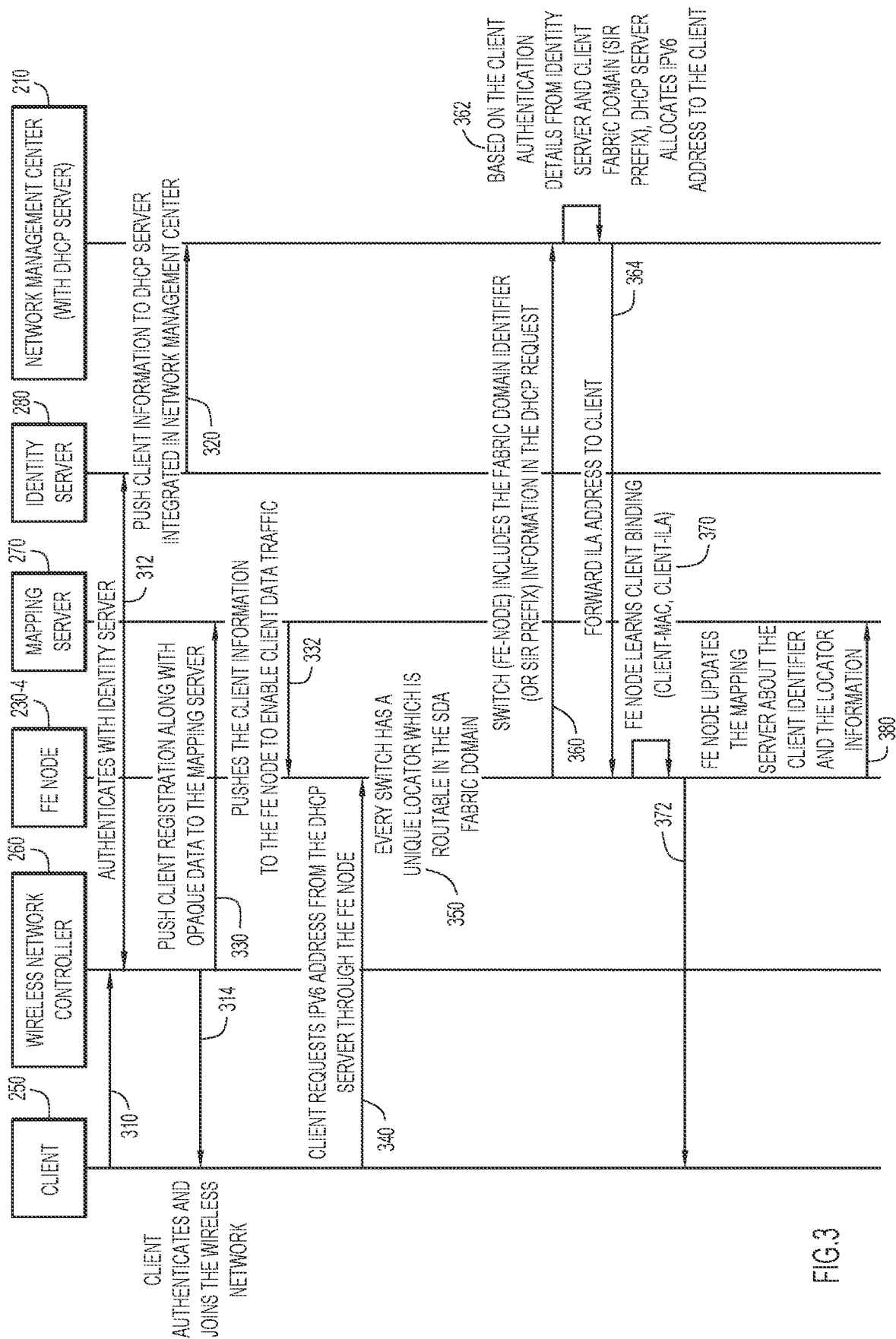
FIG. 3 is a sequence diagram showing operations performed by various components in the system of FIG. 2 to use ILA techniques, according to an example embodiment.

With reference made to FIG. 3 for description of a process 300 employing the concepts described above. The process 300 is described with respect to a client 250 joining the network. Reference is also made to FIG. 2 for purposes of the description of the process 300. At 310, the client 250 authenticates and joins a wireless network at the AP 240-1. The wireless network controller 260, at 312, authenticates the client 250 with the identity server 280, and at 314 the wireless network controller 260 returns an authentication to the client 250.

At 320, based on client authentication, the identity server 280 pushes client information to DHCP server integrated in network management center 210. At 330, the wireless network controller 260 pushes client registration of client MAC address (along with opaque data indicating the LOC/FE node behind which the client is located) to the mapping server 270. At 332, the mapping server pushes the client information (MAC address and SGT) to the FE node 230-4. The FE node 230-4 creates a MAC-address table entry for client 250 to enable the client to obtain an IP address.

At 340, the client 250 sends a request, via the FE-node 230-4, for an IPv6 address. As shown at 350, every switch (FE-node) in the enterprise fabric 220 has a unique locator that is routable in the SDA fabric domain.

At 360, the FE-node 230-4 sends a DHCP request to the DHCP server in the network management center 210. The DHCP request includes the fabric domain identifier (SIR prefix). At 362, based on the client authentication details from the identity server 280 and client fabric domain (SIR prefix), the DHCP server in the network management center allocates an IPv6 address to the client. At 364, the DHCP server forwards the ILA address (based on the assigned IPv6 address) to the FE node 230-4.

At 370, the FE node learns the client binding (client-MAC, client-ILA) based on the ILA address received from the DHCP server. At 372, the FE node 230-4 forwards the ILA address to the client 250.

At 380, the FE node updates the mapping server 270 with the client ID and the locator information (based on the ILA address).

Figure 4:
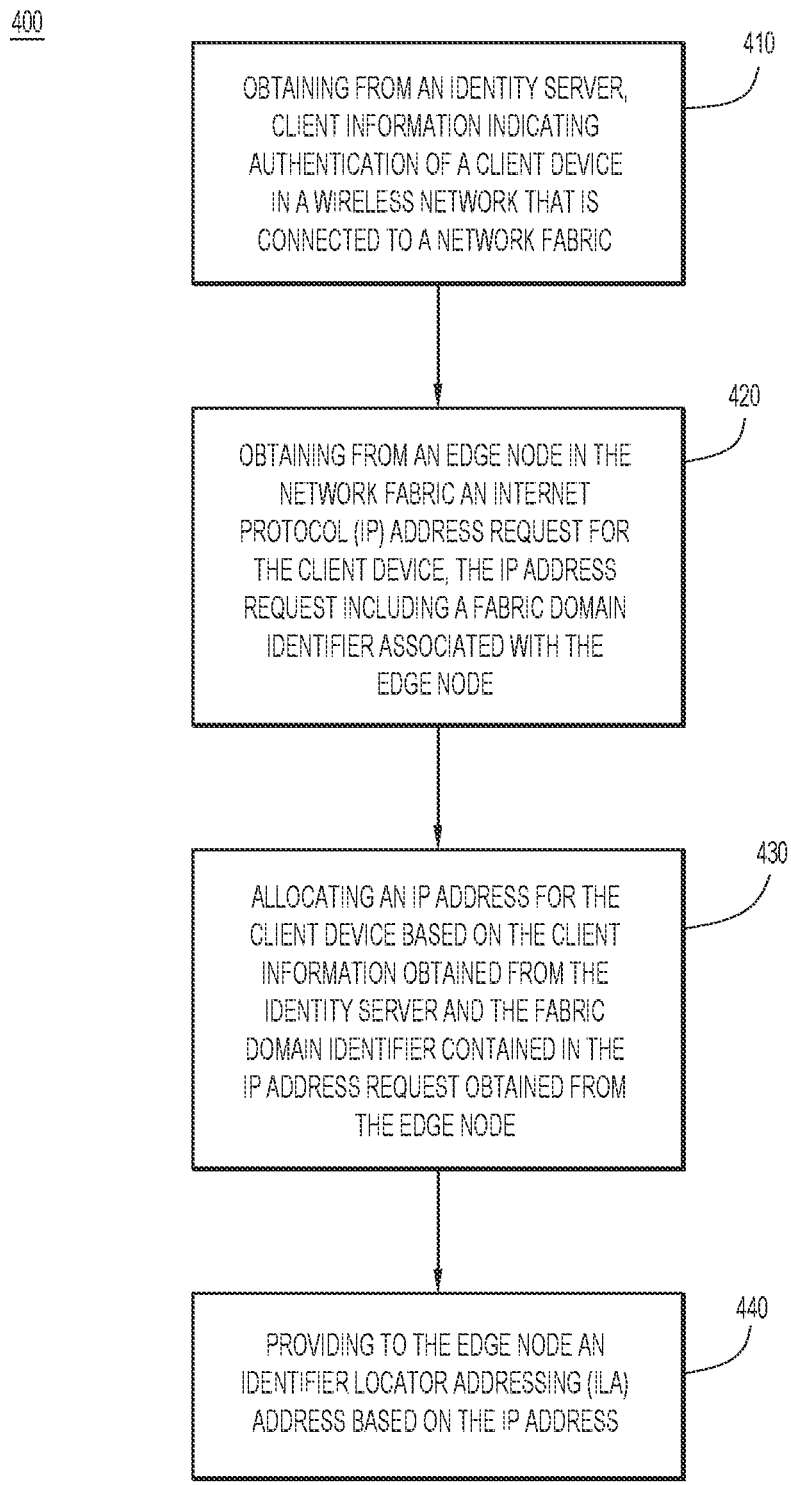
FIG. 4 is a flow chart depicting operations performed by a network management center as part of the ILA techniques, according to an example embodiment.

Reference is now made to FIG. 4, with continued reference to FIG. 2. FIG. 4 shows a flow chart of a process 400 performed by the network management center 210, including the DHCP server 212 and network management appliance 214. These operations may be cooperated performed by the DHCP server 212 and network management appliance 214.

At 410, the network management center 210 obtains (receives) from an identity server (e.g., identity server 280), client information indicating authentication of a client device in a wireless network that is connected to a network fabric. The client device connects to the wireless network at an AP, as shown in FIG. 2. At 420, the network management center 210 obtains (receives) from an edge node (e.g., FE node 230-4) in the network fabric an IP address request for the client device, the IP address request including a fabric domain identifier associated with the edge node. In one form, the fabric domain identifier is Standard Identifier Representation (SIR) prefix.

At 430, the network management center 210, and in particular the DHCP server 212, allocates an IP address for the client device based on the client information obtained from the identity server and the fabric domain identifier contained in the IP address request obtained from the edge node.

At 440, the network management center 210 provides (sends) to the edge node an ILA address based on the IP address allocated at 430. The ILA address includes a locator and an identifier, and the locator is the SIR prefix corresponding to the fabric domain identifier of the edge node.

Figure 5:
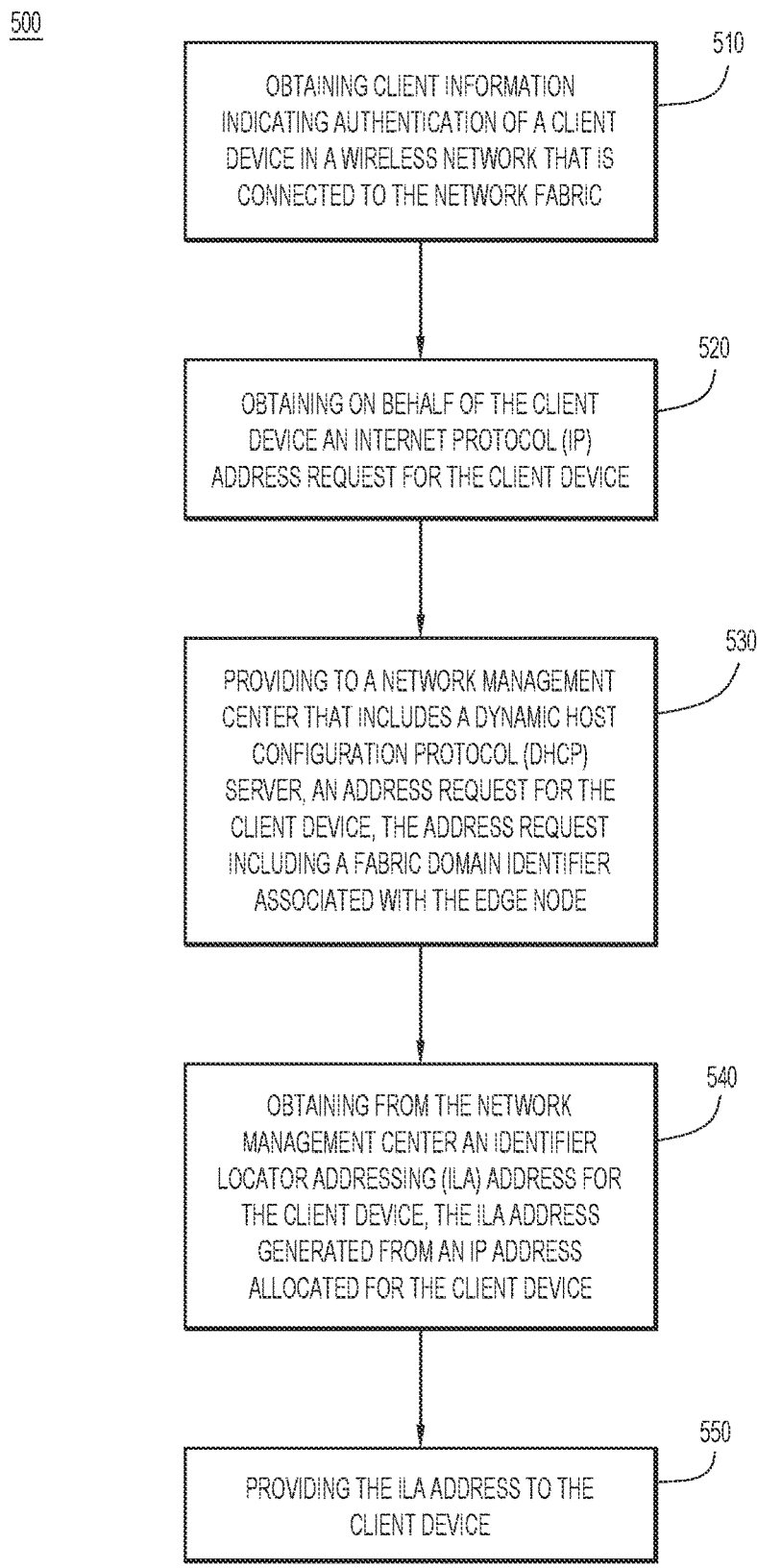
FIG. 5 is a flow chart depicting operations performed by an edge node as part of the ILA techniques, according to an example embodiment.

Reference is now made to FIG. 5. FIG. 5 shows a flow chart of a process 500 performed by an edge node in a network fabric. Reference is also made to FIG. 2 for purposes of the description of FIG. 5. At 510, the edge node obtains (receives) client information indicating authentication of a client device in a wireless network that is connected to the network fabric. For example, the edge node may obtain the client information from a wireless network controller (e.g., wireless network controller 260 shown in FIG. 2) that is in communication with an AP to which the client device joins the wireless network.

At 520, the edge node obtains on behalf of the client device an IP address request for the client device. For example, the client device sends a DHCP request to its associated AP, which forwards it to the wireless network controller, which in turn forwards the request to the edge node.

At 530, the edge node provides (sends) to a network management center (e.g., network management center 210) that includes a DHCP server (e.g., DHCP server 212), an address request for the client device, the address request including a fabric domain identifier associated with the edge node.

At 540, the edge node obtains (receives) from the network management center an ILA address for the client device. The ILA address may be generated (by the network management center 210) from an IP address allocated for the client device.

At 550, the edge node provides (sends) the ILA address to the client device. For example, the edge node sends the ILA address to the wireless network controller, which in turn forwards the ILA address to the client device. The client device can then use the ILA address for sending traffic into the network fabric.

The process 500 may further include determining (learning) a binding between a MAC address of the client device and the ILA address of the client device, and providing (sending) the ILA address to a mapping server (e.g., mapping server 270 shown in FIG. 2) to update the mapping server with client device identifier and locator information.

Furthermore, during data plane packet processing, the edge node may perform additional operations. For example, the edge node may obtain (receive) a packet sent by the client device to a destination node having connectivity to the network fabric. The packet includes a source SIR prefix associated with the client device and a destination SIR prefix associated with the destination node. The edge node may query the mapping server to obtain location information maintained by the mapping server of the destination node. The edge node then replaces the source SIR prefix with a source locator derived from the locator of the ILA address, and replaces the destination SIR prefix with a destination locator derived from a locator included in the location information obtained from the mapping server. Then, after the replacements, the edge node forwards the packet into the network fabric which routes the packet using the source locator and destination locator.

As described above, the edge node may store a cache of supporting SIR prefixes, and query the mapping server when an SIR prefixes of an incoming packet matches an SIR prefix in the cache. The query may include a tuple of a device identifier and virtual network identifier.

Figure 6:
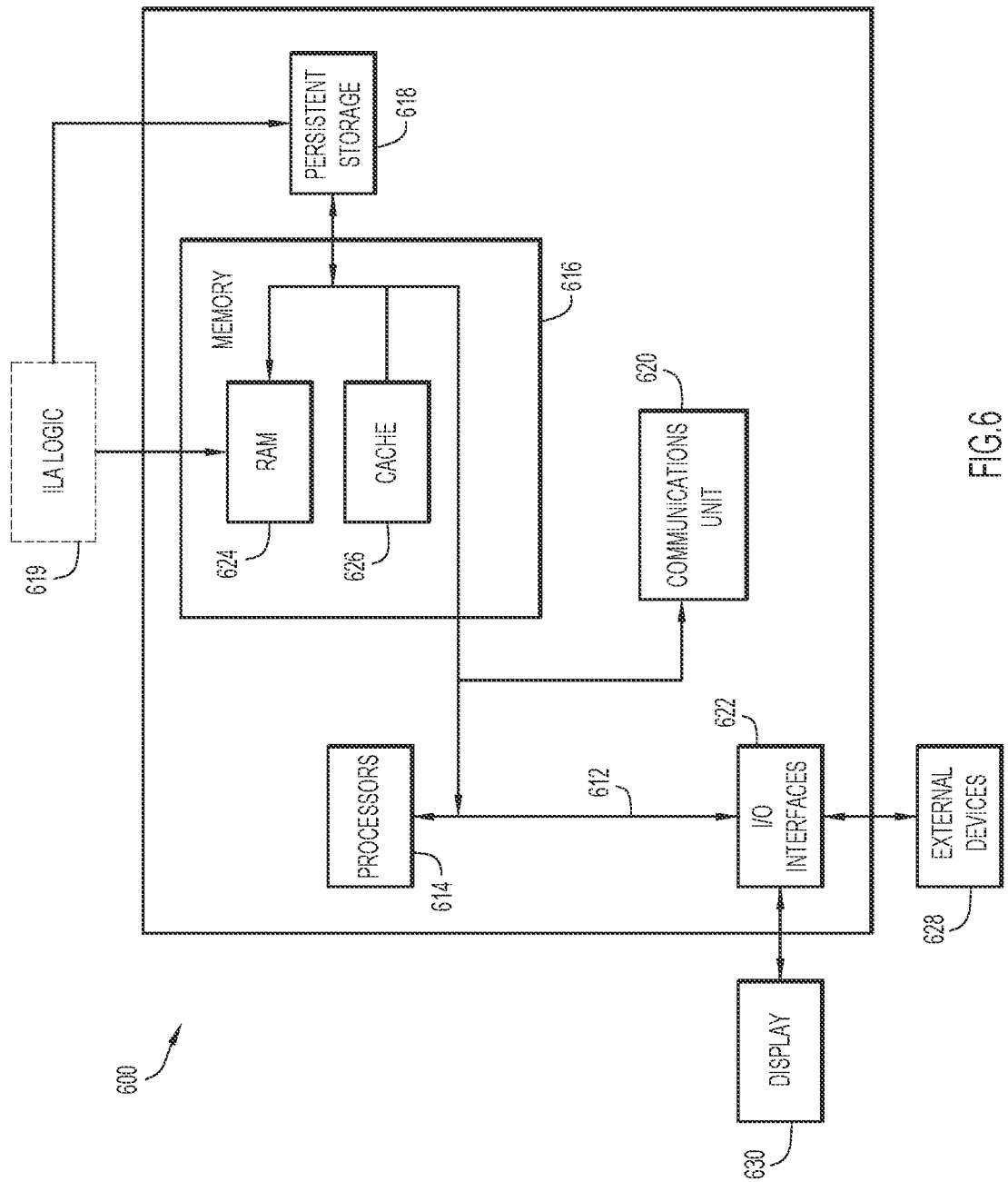
FIG. 6 is a block diagram of a device that may be configured to perform the operations to use ILA techniques, according to an example embodiment.

FIG. 6 illustrates a hardware block diagram of a device 600 that may perform the functions of any of the servers or computing, control entities (e.g., network management center 210 including DHCP server 212 and network management appliance 214) and networking devices (e.g., edge nodes, etc.) referred to herein in connection with FIGS. 1-5. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 312, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for the ILA Logic 619 may be stored in memory 316 or persistent storage 618 for execution by processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links. In the case where the device 600 is a networking device (edge node), the communications unit may consist of a plurality of networking ports and one more associated networking processing cards (line cards). The line cards may include one or more Application Specific Integrated Circuits (ASICs) configured to perform various networking (e.g., switching or routing) functions. In some embodiments, the functions performed by a networking device (e.g., edge node) in the techniques presented herein may be implemented by hardware logic configured on the one or more ASICs.

I/O interface(s) 622 allows for input and output of data with other devices that may be connected to device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 318 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., server computer, desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, memory devices, etc.) of a stationary or portable program product apparatus or device for use with stand-alone systems or systems connected by a network or other communications medium.

The communication network may be implemented by any number of any type of communications network (e.g., LAN, wide area network (WAN), Internet, Intranet, virtual private networking (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, techniques are presented herein to use of ILA techniques for a Software Defined Fabric to eliminate need for overlay tunnels in an IPv6 network. Segmentation (macro and micro) can be done in the network fabric with both VNID and SGT information carried in the data packet. The ILA mechanism can be used within an enterprise network domain or service provider network domain as long as there is a policy interface with the data plane. Since SGT is carried in the data path, this can be leveraged to integrate into an enterprise and data center network fabric.

In one form, a method is provided comprising: at a network management center that includes a Dynamic Host Configuration Protocol (DHCP) server, obtaining from an identity server, client information indicating authentication of a client device in a wireless network that is connected to a network fabric; obtaining from an edge node in the network fabric an Internet Protocol (IP) address request for the client device, the IP address request including a fabric domain identifier associated with the edge node; allocating an IP address for the client device based on the client information obtained from the identity server and the fabric domain identifier contained in the IP address request obtained from the edge node; and providing to the edge node an Identifier Locator Addressing (ILA) address based on the IP address.

In one example, the fabric domain identifier is a Standard Identifier Representation (SIR) prefix. Moreover, the ILA address includes a locator and an identifier, and wherein the locator is the SIR prefix corresponding to the fabric domain identifier of the edge node.

The method may further include: at the edge node: determining a binding between a media access control (MAC) address of the client device and the ILA address of the client device; and providing the ILA address to a mapping server to update the mapping server with client identifier and location information.

The method may still further include: at the mapping server: maintaining a mapping of SIR prefix and client identifier information.

Further, the method may further include: at the edge node: obtaining a packet sent by the client device to a destination node having connectivity to the network fabric, the packet including a source SIR prefix associated with the client device and a destination SIR prefix associated with the destination node; querying the mapping server to obtain location information maintained by the mapping server of the destination node; replacing the source SIR prefix with a source locator derived from the locator of the ILA address, and replacing the destination SIR prefix with a destination locator derived from a locator included in the location information obtained from the mapping server; and after the replacing, forwarding the packet into the network fabric which routes the packet using the source locator and destination locator.

The method may still further include: storing at the edge node a cache of supported SIR prefixes; and querying the mapping server when an incoming SIR prefixes matches an SIR prefix in the cache.

In another form, a method is provided comprising: at an edge node in a network fabric, obtaining client information indicating authentication of a client device in a wireless network that is connected to the network fabric; obtaining on behalf of the client device an Internet Protocol (IP) address request for the client device; providing to a network management center that includes a Dynamic Host Configuration Protocol (DHCP) server, an address request for the client device, the address request including a fabric domain identifier associated with the edge node; obtaining from the network management center an Identifier Locator Addressing (ILA) address for the client device, the ILA address generated from an IP address allocated for the client device; and providing the ILA address to the client device.

The method may further include: determining a binding between a media access control (MAC) address of the client device and the ILA address of the client device; and providing the ILA address to a mapping server to update the mapping server with client device identifier and locator information.

Moreover, the method may further include: obtaining a packet sent by the client device to a destination node having connectivity to the network fabric, the packet including a source SIR prefix associated with the client device and a destination SIR prefix associated with the destination node; querying the mapping server to obtain location information maintained by the mapping server of the destination node; replacing the source SIR prefix with a source locator derived from the locator of the ILA address, and replacing the destination SIR prefix with a destination locator derived from a locator included in the location information obtained from the mapping server; and after the replacing, forwarding the packet into the network fabric which routes the packet using the source locator and destination locator.

Further, the method may include: storing at the edge node a cache of supported SIR prefixes; and querying the mapping server when an SIR prefixes of an incoming packet matches an SIR prefix in the cache. Querying the mapping server may comprise providing a query that includes a tuple of a device identifier and a virtual network identifier.

In another form, an apparatus is provided comprising: a communication interface configured to enable network communications on behalf of a network management center that includes a Dynamic Host Configuration Protocol (DHCP) server; and a processor coupled to the communication interface, wherein the processor is configured to perform operations including: obtaining from an identity server, client information indicating authentication of a client device in a wireless network that is connected to a network fabric; obtaining from an edge node in the network fabric an Internet Protocol (IP) address request for the client device, the IP address request including a fabric domain identifier associated with the edge node; allocating an IP address for the client device based on the client information obtained from the identity server and the fabric domain identifier contained in the IP address request obtained from the edge node; and providing to the edge node an Identifier Locator Addressing (ILA) address based on the IP address.

In still another form, a system is provided comprising the apparatus and the edge node, and wherein the edge node is configured to: determine a binding between a media access control (MAC) address of the client device and the ILA address of the client device; and provide the ILA address to a mapping server to update the mapping server with client identifier and location information. The mapping server may be configured to maintain a mapping of SIR prefix and client identifier information.

The edge node may be configured to: obtain a packet sent by the client device to a destination node having connectivity to the network fabric, the packet including a source SIR prefix associated with the client device and a destination SIR prefix associated with the destination node; query the mapping server to obtain location information maintained by the mapping server of the destination node; replace the source SIR prefix with a source locator derived from the locator of the ILA address, and replacing the destination SIR prefix with a destination locator derived from a locator included in the location information obtained from the mapping server; and after replacing, forward the packet into the network fabric which routes the packet using the source locator and destination locator.

In still another form, an apparatus is provided comprising a communication interface configured to enable network communications on behalf of an edge node in a network fabric; and a processor coupled to the communication interface and configured to perform operations including: obtaining client information indicating authentication of a client device in a wireless network that is connected to the network fabric; obtaining on behalf of the client device an Internet Protocol (IP) address request for the client device; providing to a network management center that includes a Dynamic Host Configuration Protocol (DHCP) server, an address request for the client device, the address request including a fabric domain identifier associated with the edge node; obtaining from the network management center an Identifier Locator Addressing (ILA) address for the client device, the ILA address generated from an IP address allocated for the client device; and providing the ILA address to the client device.

In yet another form, one or more non-transitory computer readable storage media are provided that, when executed by a processor of a network management center that includes a Dynamic Host Configuration Protocol (DHCP) server, cause the processor to perform operations including: obtaining from an identity server, client information indicating authentication of a client device in a wireless network that is connected to a network fabric; obtaining from an edge node in the network fabric an Internet Protocol (IP) address request for the client device, the IP address request including a fabric domain identifier associated with the edge node; allocating an IP address for the client device based on the client information obtained from the identity server and the fabric domain identifier contained in the IP address request obtained from the edge node; and providing to the edge node an Identifier Locator Addressing (ILA) address based on the IP address.

In still another form, one or more non-transitory computer readable storage media are provided that, when executed by a processor of an edge node in a network fabric, cause the processor to perform operations including: obtaining client information indicating authentication of a client device in a wireless network that is connected to the network fabric; obtaining on behalf of the client device an Internet Protocol (IP) address request for the client device; providing to a network management center that includes a Dynamic Host Configuration Protocol (DHCP) server, an address request for the client device, the address request including a fabric domain identifier associated with the edge node; obtaining from the network management center an Identifier Locator Addressing (ILA) address for the client device, the ILA address generated from an IP address allocated for the client device; and providing the ILA address to the client device.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a network management center that includes a Dynamic Host Configuration Protocol (DHCP) server, obtaining, from an identity server, client information indicating authentication of a client device in a wireless network that is connected to a network fabric;
   obtaining from an edge node in the network fabric an Internet Protocol (IP) address request for the client device, the IP address request including a Standard Identifier Representation (SIR) prefix associated with the edge node;
   allocating an IP address for the client device based on the client information obtained from the identity server and the SIR prefix contained in the IP address request obtained from the edge node;
   providing to the edge node an Identifier Locator Addressing (ILA) address based on the IP address; and
   at the edge node:
   determining a binding between a media access control (MAC) address of the client device and the ILA address of the client device.

2. The method of claim 1, wherein the ILA address includes a locator and an identifier, and wherein the locator is the SIR prefix.

3. The method of claim 1, further comprising, at the edge node:
   obtaining a packet sent by the client device to a destination node having connectivity to the network fabric, the packet including a source SIR prefix associated with the client device and a destination SIR prefix associated with the destination node; and
   querying a mapping server to obtain location information maintained by the mapping server of the destination node.

4. The method of claim 3, further comprising, at the edge node:
   replacing the source SIR prefix with a source locator derived from a locator of the ILA address, and replacing the destination SIR prefix with a destination locator derived from a locator included in the location information obtained from the mapping server; and
   after the replacing, forwarding the packet into the network fabric which routes the packet using the source locator and the destination locator.

5. The method of claim 3, further comprising:
   storing at the edge node a cache of supported SIR prefixes; and
   querying the mapping server when an incoming SIR prefix matches an SIR prefix in the cache.

6. The method of claim 5, wherein querying the mapping server comprises providing a query that includes a tuple of a device identifier and a virtual network identifier.

7. The method of claim 1, further comprising providing the ILA address to a mapping server to update the mapping server with client identifier and location information.

8. A method comprising:
   at an edge node in a network fabric, obtaining client information indicating authentication of a client device in a wireless network that is connected to the network fabric;
   obtaining on behalf of the client device an Internet Protocol (IP) address request for the client device;
   providing, to a network management center that includes a Dynamic Host Configuration Protocol (DHCP) server, an address request for the client device, the address request including a Standard Identifier Representation (SIR) prefix associated with the edge node;
   obtaining from the network management center an Identifier Locator Addressing (ILA) address for the client device, the ILA address generated from an IP address allocated for the client device;

providing the ILA address to the client device; and determining a binding between a media access control (MAC) address of the client device and the ILA address of the client device.

9. The method of claim 8, wherein the ILA address includes a locator and an identifier, and wherein the locator is the SIR prefix.

10. The method of claim 8, further comprising:

obtaining a packet sent by the client device to a destination node having connectivity to the network fabric, the packet including a source SIR prefix associated with the client device and a destination SIR prefix associated with the destination node; and querying a mapping server to obtain location information maintained by the mapping server of the destination node.

11. The method of claim 10, further comprising:

replacing the source SIR prefix with a source locator derived from a locator of the ILA address, and replacing the destination SIR prefix with a destination locator derived from a locator included in the location information obtained from the mapping server; and after the replacing, forwarding the packet into the network fabric which routes the packet using the source locator and the destination locator.

12. The method of claim 10, further comprising:

storing at the edge node a cache of supported SIR prefixes; and querying the mapping server when an SIR prefix of an incoming packet matches an SIR prefix in the cache.

13. The method of claim 12, wherein querying the mapping server comprises providing a query that includes a tuple of a device identifier and a virtual network identifier.

14. The method of claim 8, further comprising providing the ILA address to a mapping server to update the mapping server with client identifier and location information.

15. An apparatus including:

a communication interface configured to enable network communications on behalf of a network management center that includes a Dynamic Host Configuration Protocol (DHCP) server; and a processor coupled to the communication interface, wherein the processor is configured to perform operations including:

obtaining, from an identity server, client information indicating authentication of a client device in a wireless network that is connected to a network fabric;

obtaining from an edge node an Internet Protocol (IP) address request for the client device, the IP address request including a Standard Identifier Representation (SIR) prefix associated with the edge node;

allocating an IP address for the client device based on the client information obtained from the identity server and the SIR prefix contained in the IP address request obtained from the edge node; and providing to the edge node an Identifier Locator Addressing (ILA) address based on the IP address, wherein the edge node is configured to perform operations including:

determining a binding between a media access control (MAC) address of the client device and the ILA address of the client device.

16. The apparatus of claim 15, wherein the ILA address includes a locator and an identifier, and wherein the locator is the SIR prefix.

17. A system comprising the apparatus of claim 15 and the edge node, wherein the edge node is configured to perform operations including:

obtaining a packet sent by the client device to a destination node having connectivity to the network fabric, the packet including a source SIR prefix associated with the client device and a destination SIR prefix associated with the destination node; and querying a mapping server to obtain location information maintained by the mapping server of the destination node.

18. The system of claim 17, wherein the edge node is further configured to perform operations including:

replacing the source SIR prefix with a source locator derived from a locator of the ILA address, and replacing the destination SIR prefix with a destination locator derived from a locator included in the location information obtained from the mapping server; and after the replacing, forwarding the packet into the network fabric which routes the packet using the source locator and the destination locator.

19. The system of claim 17, wherein the edge node is further configured to perform operations including:

storing a cache of supported SIR prefixes; and querying the mapping server when an SIR prefix of an incoming packet matches an SIR prefix in the cache.

20. The apparatus of claim 15, wherein the edge node is configured to perform operations including: providing the ILA address to a mapping server to update the mapping server with client identifier and location information.

* * * * *